E. G. & A. E. QUICKEL.
LIME SPREADER.
APPLICATION FILED FEB. 18, 1910.
965,936.
Patented Aug. 2, 1910.
2 SHEETS—SHEET 1.
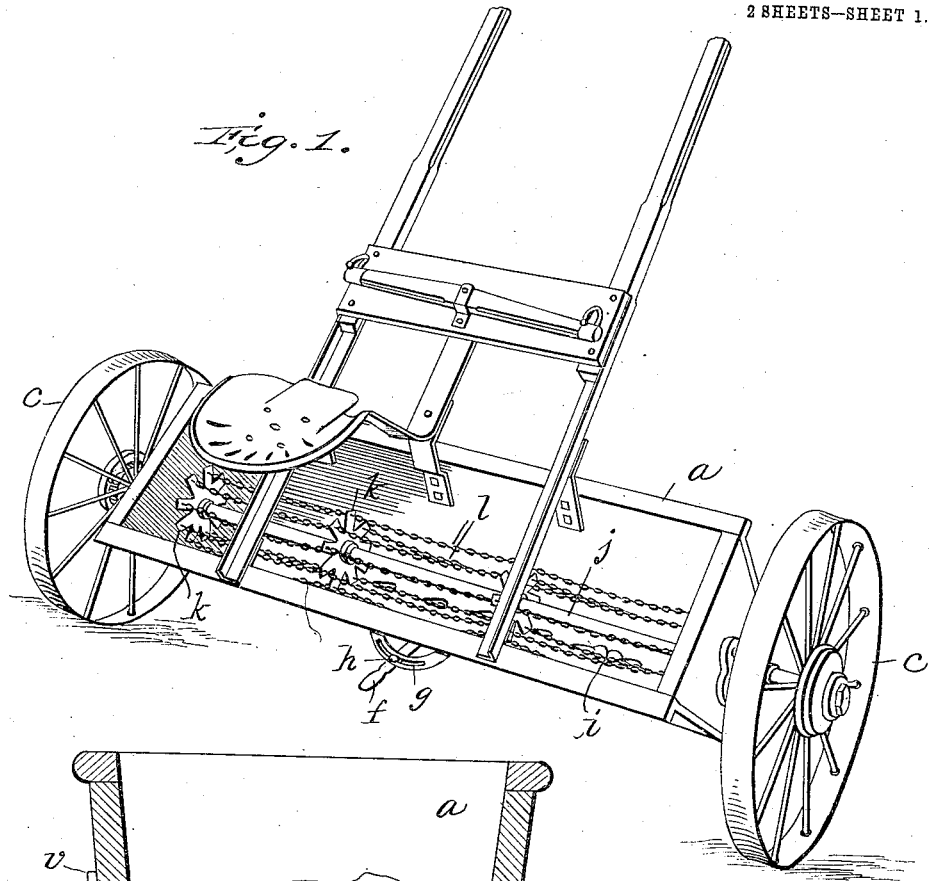
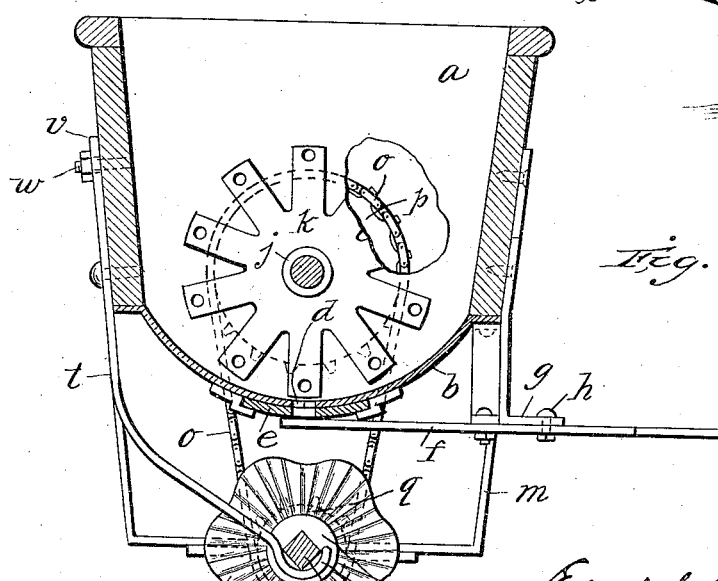

E. G. & A. E. QUICKEL.
LIME SPREADER.
APPLICATION FILED FEB. 18, 1910.
965,936.
Patented Aug. 2, 1910.
2 SHEETS—SHEET 2.
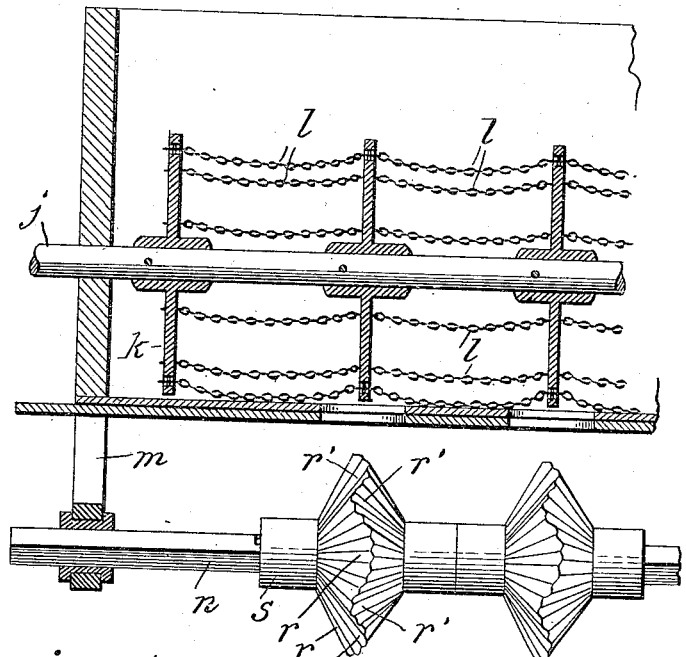
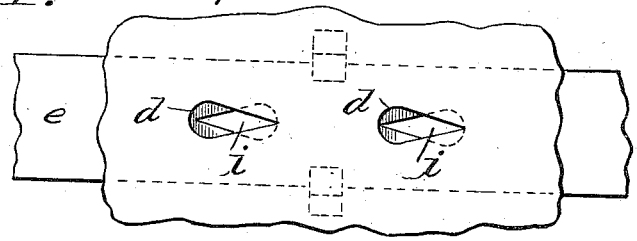
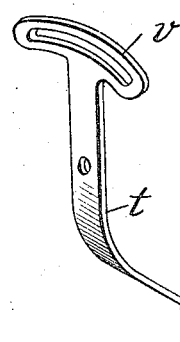
Witnesses
Edwin L. Jewell
Bernice Bridges.
Inventors
Edwin G. Quickel
Allen E. Quickel
By Davis & Davis
Attorneys

UNITED STATES PATENT OFFICE.

EDWIN G. QUICKEL AND ALLEN E. QUICKEL, OF YORK, PENNSYLVANIA.

LIME-SPREADER.

965,936.  Specification of Letters Patent.  Patented Aug. 2, 1910.

Application filed February 18, 1910. Serial No. 544,580.

*To all whom it may concern:*

Be it known that we, EDWIN G. QUICKEL and ALLEN E. QUICKEL, citizens of the United States of America, and residents of York, in the county of York and State of Pennsylvania, have invented certain new and useful Improvements in Lime-Spreaders, of which the following is a full and clear specification, reference being had to the accompanying drawings, in which—

Figure 1 is a perspective view of our complete machine; Fig. 2 a vertical sectional view taken through the hopper; Fig. 3 a longitudinal vertical sectional view taken through one end of the hopper; Fig. 4 a detail plan view of a portion of the bottom of the hopper; and Fig. 5 a perspective view of an arm for holding the spreader shaft in its longitudinally adjusted position.

The object of this invention is to provide a simple machine for evenly spreading pulverized and ground lime upon the surface of the ground, the special improvements relating to the means in the hopper for keeping the lime thoroughly stirred up and for forcing it through the feed-openings and also for evenly spreading the lime as it falls from the hopper, as more fully hereinafter set forth.

In the drawing, $a$ designates a hopper of the usual construction provided with a bottom $b$ curved transversely, said hopper being mounted in any suitable manner upon a pair of wheels $c$. The bottom at intervals, along its longitudinal center is provided with discharge openings $d$, and attached to the under side of the hopper bottom is a slide $e$ which is adapted to be adjusted longitudinally of the bottom by means of lever $f$ which is adapted to be locked in its adjusted position by means of a slotted segment $g$, attached to the hopper, and a clamp bolt $h$. The slide $e$ is provided with openings $i$ corresponding with the openings $d$, the two sets of openings overlapping each other and being tapered in opposite directions, so that an approximately diamond shaped discharge opening is formed thereby, this opening being varied as to length and width while preserving its general shape by simply adjusting the slide $e$ in one direction or the other.

In the end walls of the hopper is journaled a shaft $j$ whose ends are extended beyond the end walls of the hopper and have the wheels $c$ rigidly attached to them. Within the hopper and attached to this shaft $j$ is a series of spiders $k$ each having a series of radial arms whose ends work close to the concaved bottom of the hopper when the shaft is rotated. One of these spiders is preferably provided for each discharge opening in the bottom, the spider being so arranged on the shaft that its arms move across the discharge opening about midway its length, whereby the lime will be prevented from packing or caking around the discharge openings. The corresponding arms on these spiders are connected together by chains $l$, these chains running practically the full length of the hopper so as to sweep, as the shaft rotates, the entire surface of the hopper bottom. The chains are not drawn taut between the arms but are loosely swung therebetween so as to drag across the concave surface of the hopper bottom between the feed openings. In other words the chains are, so to speak, festooned from arm to arm the full length of the hopper. In this way the lime in the hopper is continually stirred up and kept in a powdered form so that an even and regular discharge at all the openings is assured. By thus making the stirring devices in the form of open-link chains, we find that the power required for constantly stirring the mass of lime in the hopper is reduced to a minimum, since the loose chains are capable of being dragged through the mass with much less friction than rigid or straight wires or rods can be.

Journaled on suitable hangers $m$, directly in line with the discharge openings in the bottom of the hopper, is a shaft $n$ which is rotated by means of a chain $o$ connecting the sprocket wheel $p$ on one end of the shaft $j$ to the sprocket wheel $q$ on one end of said shaft $n$. Rigidly mounted on this shaft is a series of spreading disks $r$, one being mounted centrally under each discharge opening and each being provided with a hub-like sleeve $s$, these hubs preferably abutting together on the shaft, as shown in Fig. 3. In this construction it will be observed that the shaft $n$ will be rotated when the shaft $j$ is rotated and as the lime drops upon the edges of the disks $r$ the down-falling stream will be broken up and spread in opposite directions. The shaft $n$ is capable of longitudinal adjustment in its bearings so that it may be shifted to bring the spreading disks directly under the discharge openings. The shaft is locked in this adjusted position by means of an arm $t$ bolted to the front wall of the hopper and extended downwardly to the shaft and there provided with a curved end piece $u$ which lies between adjacent hubs $s$ of the spreader disks. The upper part of the arm is provided with an arcuate portion $v$ which is slotted and which affords, in connection with a bolt $w$ the means of locking the arm in its adjusted position.

Each of the spreaders $r$ consists of a substantially circular body preferably having an edge which in side elevation shows in an escalloped form, the body being tapered from its hub to a peripheral edge and each tapered side of the body being provided with radial grooves $r'$ which widen from the hub toward the edge, the grooves on one side alternating with the grooves on the other side, so that the edge of the body shall have a serpentine formation. The rotation of this device in the falling stream of powdered lime divides the stream and the grooves $r'$ serve to throw the two divisions of the stream forwardly and outwardly. The beveled surfaces of the disk are radially fluted, these flutes tapering from the edge toward the hub, so that these flutes or corrugations shall form fins or flanges which shall engage the particles of lime and insure the lime being thoroughly scattered by being thrown forwardly in opposite directions away from the spreader. The employment of a series of these peculiarly formed spreaders arranged side by side throughout the length of the hopper causes the forwardly thrown streams to intermingle with each other and thus result in an even spreading of the lime upon the ground.

Having thus fully described our invention, what we claim as new and desire to secure by Letters Patent, is—

1. In a fertilizer distributer, the combination of a hopper and transporting wheels said hopper having its bottom concaved transversely and provided with spaced feed openings, a rotary shaft extending longitudinally through the hopper and provided at intervals with radial arms, and slack chains carried by the outer ends of the arms and festooned between them, the slack between the arms being sufficient to cause the chains to drag across in contact with the concaved bottom when the shaft is rotated, for the purpose set forth.

2. In an apparatus of the class set forth, a hopper having a concaved bottom provided with spaced feed openings, a rotary shaft within the hopper, transporting wheels, means for driving said rotary shaft, and means within the hopper for stirring the fertilizer material as the shaft rotates, said means consisting of a series of spiders fastened to the shaft and provided with radial arms, one of these spiders being arranged immediately above each of the feed openings so that the arms thereof will sweep across the feed openings, and a series of chains connecting said radial arms at their outer ends, said chains being loosely hung on the arms so that as the spiders rotate the chains will sweep across in contact with the concave bottom of the hopper at points between the openings, for the purpose set forth.

3. In combination with a hopper and means for stirring the lime therein, a spreader mechanism underneath the hopper consisting of a longitudinal shaft and a series of disk-like spreaders thereon each having an approximately serpentine edge and alternately arranged grooves in its opposite sides.

4. In combination with a hopper and means for stirring the lime therein, a spreader mechanism underneath the hopper consisting of a longitudinal shaft and a series of disk-like spreaders thereon each having an approximately serpentine edge and alternately arranged grooves in its opposite sides, each having its edge approximately serpentine or zig-zag and alternately arranged grooves on its opposite beveled sides these grooved surfaces being fluted radially.

In testimony whereof we hereunto affix our signatures in the presence of two witnesses this 17th day of February 1910.

EDWIN G. QUICKEL.
ALLEN E. QUICKEL.

Witnesses:
C. U. BAUGHMAN,
S. S. HAY.